United States Patent [19]

Spevack

[11] Patent Number: 4,714,525

[45] Date of Patent: Dec. 22, 1987

[54] PROCESS FOR SEPARATING HIGH PURITY WATER

[75] Inventor: Jerome S. Spevack, New Rochelle, N.Y.

[73] Assignee: Deuterium Corporation, Nev.

[21] Appl. No.: 815,783

[22] Filed: Jan. 3, 1986

Related U.S. Application Data

[60] Continuation of Ser. No. 371,411, Apr. 23, 1982, which is a division of Ser. No. 111,229, Jan. 11, 1980, Pat. No. 4,331,513, which is a continuation of Ser. No. 823,677, Aug. 11, 1979, abandoned, which is a continuation of Ser. No. 590,071, Jun. 25, 1975, abandoned, which is a division of Ser. No. 497,451, Aug. 14, 1974, Pat. No. 4,008,046, which is a division of Ser. No. 126,623, Mar. 22, 1971, Pat. No. 3,872,223.

[51] Int. Cl.$^4$ ............................. C02F 1/04; C01B 5/02
[52] U.S. Cl. .......................................... 203/10; 203/5;
   203/31; 203/87; 203/DIG. 19; 202/182;
   202/186; 202/198; 423/580
[58] Field of Search .................... 203/5, 10, 11, 87, 31,
   203/98, 99, DIG. 2, DIG. 22, DIG. 19;
   423/580; 202/182, 186, 185.1, 198, 161, 158,
   202, 270

[56] References Cited

U.S. PATENT DOCUMENTS

| | | | |
|---|---|---|---|
| 233,184 | 10/1880 | Baird | 203/31 |
| 2,227,485 | 1/1941 | Bump | 203/31 |
| 2,837,469 | 6/1958 | Mohn | 203/10 |
| 2,842,485 | 7/1958 | Zellner | 202/174 |
| 2,999,795 | 9/1961 | Yagi et al. | 203/5 |
| 3,049,480 | 8/1962 | Vernon | 203/10 |
| 3,214,347 | 10/1965 | Grekel et al. | 203/31 |
| 3,408,264 | 10/1968 | Ward | 203/99 |
| 3,408,266 | 10/1968 | Ward | 203/99 |
| 3,417,000 | 12/1968 | Chaconas | 203/DIG. 2 |
| 3,445,347 | 5/1969 | Borrel et al. | 203/99 |
| 3,685,967 | 8/1972 | Thayer | 423/580 |
| 3,713,991 | 1/1973 | Thomas | 203/99 |
| 3,870,606 | 3/1975 | Tabata et al. | 203/5 |

FOREIGN PATENT DOCUMENTS 1224946  3/1971  United Kingdom ............ 203/5

OTHER PUBLICATIONS

"Production of Heavy Water", Savannah River and Dana Plants, Technical Manual; U.S. Atomic Energy Commission Report DP-400, Jul. 1959, pp. 112, 113, 115 & 116.
Standard Methods for the Examination of Water and Waste Water; 1969 American Public Health Association, N.Y., N.Y., p. 4.

Primary Examiner—Wilbur Bascomb

[57] ABSTRACT

A process for purifying impure water, e.g. heavy water, which provides for the removal of dissolved inorganic and organic contaminants by distillation of the water and washed vapor withdrawal, and optional chemical pretreatment of oxidazable matter.

8 Claims, 1 Drawing Figure

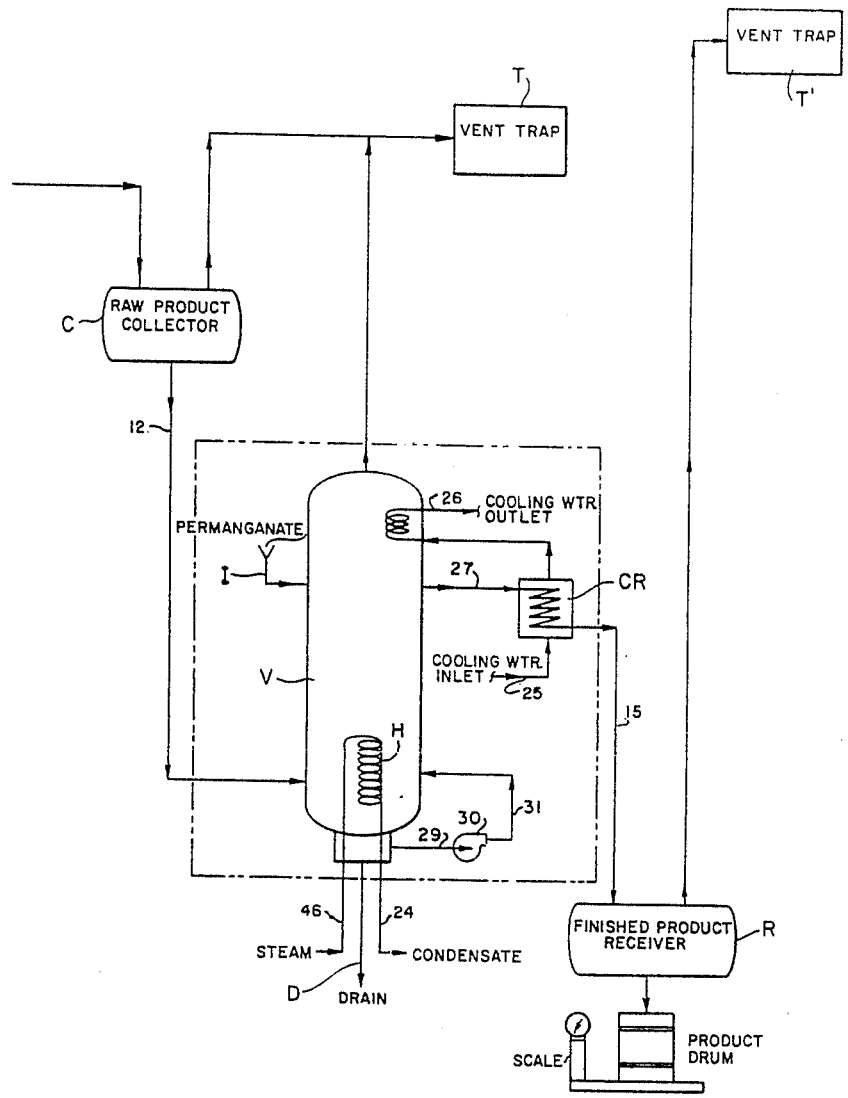

PROCESS FOR SEPARATING HIGH PURITY WATER

BACKGROUND OF THE INVENTION

1. Field of the Invention

This application relates particularly to a system for producing a high-purity water product which may be incorporated as the product finishing stage of a heavy water production system.

2. Description of the Prior Art

In the prior art, the purification of water containing contaminants, e.g. a concentrate of heavy water (deuturium oxide) from a heavy water production plant, has been performed by the distillation process of boiling the water and passing the vapors in a reflux fractionating column with withdrawal of a portion of the reflux condensate as the purified water product. Addition of potassium permanganate to the boiling water has been employed to remove oxidizable impurities. Such prior art is described in U.S. Atomic Energy Commission Report DP-400 "Production of Heavy Water, Savannah River and Dana Plants, Technical Manual, July 1959." Because ordinary distilled water may still contain traces of impurities, a high-purity water product could be obtained only by double or triple water distillations.

SUMMARY OF THE INVENTION

The present invention aims to provide a system for purifying impure water, e.g. heavy water which may be produced in accordance with my aforesaid patent applications Ser. No. 126,692 and Ser. No. 126,623 (now U.S. Pat. Nos. 3,860,618 and 3,872,221) for the removal therefrom of dissolved inorganic and/or organic contaminants to provide a pure product.

BRIEF DESCRIPTION OF THE DRAWINGS

In the accompanying drawing, the single FIGURE is a flow diagram of a system for purifying an impure liquid water, e.g. heavy water, according to this invention.

DESCRIPTION OF PREFERRED EMBODIMENT

The embodiment shown in the drawing is particularly adapted to receive water partially enriched in deuterium content by a dual temperature exchange system, e.g. the three stage system described in my co-pending application Ser. No. 126,692 filed concurrently herewith (now/U.S. Pat. No. 3,860,698 issued Jan. 14, 1975), and herein incorporated by reference, whereby enrichment to a concentration of deuterium from about 7 to 15 mol percent is attained, and which may be supplemented by fourth and fifth stages as illustrated in my copending application Ser. No. 126,623 (now U.S. Pat. No. 3,872,223 issued Mar. 18, 1975), herein incorporated by reference.

REFERRING TO THE ACCOMPANYING DRAWING

In the exemplary embodiment the purpose of the product finishing system is to purify liquid water containing dissolved contaminant matter and in particular such water which has been enriched in deuterium content by a heavy water production process, e.g. a concentrate of heavy water, by distillation and chemical treatment so that it will meet high-purity requirements. The system preferably consists of two identical sections installed in parallel, so that one may be available for stand-by. Each system includes a raw product heavy water collector C, a heavy water purifying vessel V, and a finished product receiver R. A scale is used to weigh the finished product.

The impure heavy water to be purified, e.g. the condensate from 11 in the aforesaid Pat. No. 3,872,223, continuously enters the system at the top of the stainless steel raw product collector C. During the distillation operation, raw product impure heavy water passes via 12 to a vessel V, which is a 30 gallon stainless steel unit consisting of a lower evaporator section, an intermediate section and an upper high-purity condenser section. A steam coil H, having supply and discharge means 46 and 24, provides heat for evaporating heavy water vapor from the impure heavy water in said lower evaporating section. As illustrated, circulating means shown as pump 30 with piping 29 and 31 is provided for circulating the impure heavy water in contact with the heater H in said lower section.

Heavy water passes from the evaporator section at the lower part of vessel V, through the intermediate section to the high-purity condenser section at the upper part of vessel V where it is condensed to liquid condensate all of which is returned to said lower evaporator section through said intermediate section wherein reflux and backwashing of the vapor in the intermediate section is effected by its countercurrent contact with condensate formed in the upper condensing section of the vessel V. As illustrated in the drawing, a portion of the so purified vapor is withdrawn from the intermediate section at a location more proximate to said upper section than to said lower section via withdrawal means comprising conduit 27, whereby vapor reaching said location has been purified by traversing a major part of said vapor back-washing intermediate section and condensate formed from purified vapor in said upper section and reaching said lower section has effected said purifying by back-washing all said vapor in said major part of said intermediate section. Said conduit 27 connects to line 15 through an indirect contact condenser CR having a cooling water inlet 25 and the cooled product is passed through a conductivity cell in line 15 (cell not shown) which monitors its purity; a product with higher conductivity, i.e. electrolyte concentration, than is desired is returned to the evaporator section by suitable means (not shown).

Potassium permanganate is added via inlet I to the top of the evaporator section to oxidize any organic matter or other oxidizable contaminants in the raw product delivered from collector C via 12 or otherwise gaining access to the vessel V. The spent permanganate is periodically removed via a drain connection D.

The concentrated product is withdrawn into the finished product receiver. It is periodically discharged into product drums and weighed. The collector C and vessel V and receiver R are vented to refrigerated trap means T and T' to prevent loss of valuable heavy water vapor.

While there have been described herein what are at present considered preferred embodiments of the invention, it will be obvious to those skilled in the art that modifications' including changes and omissions and substitutions, may be made without departing from the essence and principle of the invention. It is therefore to be understood that the exemplary embodiments are illustrative and not restrictive of the invention, the scope of which is defined in the appended claims, and that all modifications that come within the meaning and

I claim:

1. A process for separating essentially pure water enriched in deuterium from liquid water which contains dissolved contaminant matter, comprising:
   (a) supplying said liquid water to the lower section of a closed vessel, said closed vessel comprising said lower section, an upper section and an intermediate section communicating between said lower and upper sections,
   (b) heating and vaporizing said water in said lower section,
   (c) passing said vaporized water from step (b) upwardly in said intermediate section of said closed vessel,
   (d) withdrawing from said intermediate section a portion of said vaporized water which has traversed the major part of said intermediate section,
   (e) passing the other portion of said vaporized water upwardly through the remaining part of said intermediate section into said upper section,
   (f) condensing vaporized water from step (e) in said upper section,
   (g) passing all of the condensed water from said upper section to said lower section downwardly through said intermediate section to said lower section in countercurrent contact with the vaporized water passing therein,
   (h) condensing vaporized water withdrawn in step (d), and
   (i) collecting condensed essentially pure water enriched in deuterium from step (h) essentially free of said matter.

2. A process according to claim 1, wherein at least a part of said contaminant matter is oxidizable, which process further comprises:
   (j) before step (d), adding potassium permanganate to the liquid water passing from said upper section to said lower section for oxidizing said oxidizable contaminant, and
   (k) removing spent permanganate from said lower section.

3. A process according to claim 2, wherein said oxidizable matter is at least in part organic.

4. A process according to claim 1, wherein said contaminant is at least in part inorganic.

5. A process for separating a liquid concentrate of heavy water from dissolved contaminant matter contained therein, which comprises:
   (a) supplying said liquid heavy water concentrate to the lower section of a closed vessel, said vessel comprising said lower section, an upper section and an intermediate section communicating between said lower and upper sections;
   (b) heating and vaporizing heavy water concentrate in said lower section;
   (c) passing vaporized heavy water concentrate from step (b) upwardly in said intermediate section of said vessel;
   (d) withdrawing from said intermediate section a portion of said vaporized heavy water concentrate which has traversed the major part of said intermediate section;
   (e) passing the other portion of said vaporized heavy water concentrate upwardly through the remaining part of said intermediate section into said upper section;
   (f) condensing vaporized heavy water concentrate from step (e) to liquid in said upper section;
   (g) passing all of the condensed heavy water concentrate liquid from said upper section to said lower section downwardly through said intermediate section to said lower section in countercurrent contact with the vaporized heavy water concentrate passing therein;
   (h) condensing vaporized heavy water concentrate withdrawn in step (d) to liquid, and
   (i) collecting condensed heavy water concentrate liquid from step (h) essentially free of said contaminant matter.

6. A process according to claim 5, wherein at least a part of said contaminant matter is oxidizable, which further comprises:
   (j) before step (d), adding potassium permanganate to the liquid passing from said upper section to said lower section and oxidizing said oxidizable contaminant therewith; and
   (k) removing spent permanganate from said lower section;

7. A process according to claim 6, wherein said oxidizable matter is at least in part organic.

8. A process according to claim 1, wherein said contaminant matter is at least in part inorganic.

* * * * *